United States Patent [19]

Clark et al.

[11] Patent Number: 5,210,156

[45] Date of Patent: May 11, 1993

[54] STABLE, MOISTURE-CURABLE SILICONE PRESSURE SENSITIVE ADHESIVES

[75] Inventors: Joseph N. Clark, Freeland; Robert H. Krahnke, Midland; Shawn K. Mealey, Midland; William J. Schoenherr, Midland, all of Mich.

[73] Assignee: Dow Corning Corporation, Midland, Mich.

[21] Appl. No.: 748,500

[22] Filed: Aug. 22, 1991

[51] Int. Cl.$^5$ ............................................. C08G 77/18
[52] U.S. Cl. ...................................... 525/477; 528/17; 528/34; 525/474
[58] Field of Search ..................... 528/17, 34; 525/477

[56] References Cited

U.S. PATENT DOCUMENTS

| | | | |
|---|---|---|---|
| 4,309,520 | 1/1982 | Blizzard | 525/477 |
| 4,753,977 | 6/1988 | Merrill | 525/477 |
| 4,847,400 | 7/1989 | Krahnke et al. | 528/34 |
| 5,079,311 | 1/1992 | Colas | 525/478 |
| 5,091,484 | 2/1992 | Colas et al. | 525/477 |
| 5,100,976 | 3/1992 | Hamada et al. | 525/477 |

Primary Examiner—Ralph H. Dean, Jr.
Assistant Examiner—Margaret W. Glan
Attorney, Agent, or Firm—George A. Grindahl

[57] ABSTRACT

Silicone pressure sensitive adhesive compositions which cure in the presence of moisture comprise an adhesive component which bears alkoxy radical-containing curing radicals, a catalyst to accelerate the reaction of moisture with the alkoxy radicals to form siloxane bonds and a multialkoxy silicon compound to stabilize the composition in the solventless state. Curing provides adhesives ranging from pressure sensitive adhesives having improved properties to permanent adhesives. The adhesives are useful for adhering an object to a surface and thereafter improving the bond between the object and the surface by exposure to moisture.

10 Claims, No Drawings

STABLE, MOISTURE-CURABLE SILICONE PRESSURE SENSITIVE ADHESIVES

BACKGROUND OF THE INVENTION

The present invention relates to solvent-based or solvent-free compositions which provide silicone pressure sensitive adhesives, hereinafter also referred to as SPSAs, which are stable in the absence of moisture and which cure by the action of ambient moisture. In a preferred embodiment the present invention relates to SPSA compositions which cure to a permanent adhesive which is useful as a structural adhesive.

By the term "silicone pressure sensitive adhesive" it is meant an adhesive comprising one or more siloxane components and possessing sufficient tack and adhesive strength so that it can be adhered with mild pressure to a clean stainless steel substrate and then removed therefrom and adhered to the same or another clean substrate. By the term "permanent adhesive" it is meant an adhesive that bonds to a clean substrate and cannot be so removed and thereafter readhered.

At the present time all commercial SPSA compositions are designed for the relatively low strength bonding of surfaces, such as electrical insulating tapes, medical tapes and devices and high temperature masking tapes. These commercial SPSA compositions are also designed to possess their ultimate adhesive properties when first applied.

However, there is a need for a SPSA which will provide higher bonding strengths and/or which will develop additional adhesive properties, such as resistance to flow or long term durability, after being applied.

Silicone structural glazing of curtainwall panels represents one of those needs. Durable structural glazing is currently done with silicone sealants in a multi-step, labor-intensive, time-consuming process. Significant improvements in the structural glazing process could be realized if a SPSA were used in place of the silicone sealant in the current process.

Unfortunately, standard SPSAs are not completely suitable for structural glazing applications because of their inherent flowability, albeit slow in the recently improved SPSAs, under sustained stress. Under the sustained stress of gravity the heavy glass panel that is currently used in structural glazing, if not further supported, would eventually experience shear failure of a SPSA bond. A SPSA that cures to a non-shearing adhesive having high adhesive strength would be very beneficial in this and other applications.

Currie et al., U.S. Pat. No. 2,814,601, disclose SPSA compositions which are useful for bonding silicone rubber to metal such as aluminum, and which will cure to a permanent bond adhesive at room temperature.

Blizzard et al., U.S. Pat. No. 4,613,534 claims a permanent-bond adhesive for bonding coated fabric that is used in the construction of air- or tension-supported structures.

However, the compositions of Currie et al. and of Blizzard et al. cure spontaneously at room temperature when mixed, even in the absence of moisture, and therefore cannot be mixed and stored before use but, rather, must be used shortly after being prepared.

In a co-pending application for U.S. patent Ser. No. 07/748,477 filed on even date herewith and assigned to the assignee of this application, there is disclosed and claimed a moisture-curable SPSA composition which is stable in the absence of moisture when a solvent is present. However, when solvent is removed, such as when the composition is applied to a substrate and devolatilized, the SPSA has one or more deficiencies, such as limited shelf life, low tack and low wettability and/or conformability on a substrate such as glass or metal.

BRIEF SUMMARY OF THE INVENTION

It is an object of this invention to provide new SPSAs, and compositions for their preparation, which experience an increase in one or more adhesive properties when exposed to moisture. It is another object of this invention to provide compositions which provide SPSAs which will become a permanent adhesive in the presence of ambient moisture. It is a further object of this invention to provide a SPSA composition which can be prepared and stored for long periods of time in a solvent-containing or solvent-free form and can be used to provide a moisture-curable SPSA, when desired, without further mixing or processing. It is a preferred object of this invention to provide new SPSA transfer films, and compositions for their preparation, which are suitable for structural glazing applications.

These objects, and others which will become apparent to one of ordinary skill in the pressure sensitive adhesive art upon considering the following disclosure and appended claims, are obtained by the present invention which, briefly stated, comprise a composition comprising a silanol-free silicone pressure sensitive adhesive, suitably substituted with silicon-bonded curing radicals, which will cure via the curing radicals to a stronger SPSA. and preferably to a permanent adhesive, when exposed to ambient moisture; a catalyst to promote the moisture-initiated reaction of the silicon-bonded curing radicals to form siloxane bonds and a multialkoxy silicon compound to improve the storability of the composition.

In preferred compositions of this invention the silicon-bonded curing radicals bear trimethoxysilylalkyl moieties, the catalyst is an organic titanate and the multialkoxy compound is an alkyl orthosilicate.

The compositions of this invention are useful for adhering an object to a substrate without the need for means to hold the object in place while the adhesive cures. The solvent-containing compositions can be stored for long periods of time in the absence of moisture and then used to provide a moisture-curable SPSA. The solvent-free compositions, such as an adhesive transfer film, can be stored for long periods of time in the absence of moisture and then used to adhere an object to a substrate.

DETAILED DESCRIPTION OF THE INVENTION

The present invention relates to a composition comprising (A) a silanol-free silicone pressure sensitive adhesive component bearing curing radicals having the formula $R_b(OR')_{3-b}SiZ-$ and capping radicals having the formula $R_3SiO-$ wherein Z denotes a divalent radical linking the silicon atom of the curing radical to a silicon atom of the silicone pressure sensitive adhesive component, R denotes a monovalent hydrocarbon radical, R' denotes an alkyl or alkoxyalkyl radical, and the subscript b has a value of 0 or 1; all other silicon-bonded radicals of the silicone pressure sensitive adhesive component being selected from the group consisting of divalent oxygen atoms linking silicon atoms, hydrogen atoms and monovalent hydrocarbon radicals:

(B) an effective amount of a catalyst component to accelerate the reaction of the curing radicals with moisture to form siloxane bonds; and (C) an effective amount of a silicon compound bearing a plurality of silicon-bonded alkoxy radicals to improve the shelf life of the composition.

Curing radicals having the formula $R_b(OR')_{3-b}SiZ—$ are present in the SPSA component to provide a way to improve one or more physical properties of the SPSA. In the curing radicals R. when present, can be any monovalent hydrocarbon radical having, for example, from 1 to 10, preferably 1 to 6, carbon atoms, such as lower alkyl radicals exemplified by methyl, ethyl, propyl and isopropyl, alkenyl, such as vinyl; and aryl, such as phenyl. To obtain maximum curing rates for the adhesive compositions of this invention it is preferred that the value of subscript b in the curing radical formula is zero; however, when b=1, R is preferably the methyl radical.

R' denotes any alkyl or alkoxyalkyl radical, preferably having less than 5 carbon atoms, such as methyl, ethyl, isopropyl, methoxyethyl or ethoxyethyl. R' is preferably methyl.

Z denotes any divalent radical which durably links the silicon atom of the curing radical to a silicon atom of the SPSA so that (a) the silicon atom of the curing radical is not removed from the SPSA component during moisture-curing of the SPSA and (b) the moisture-curing reaction is not adversely limited. Z has no other known requirements.

Z is typically selected from the types of divalent radicals that are used to link silicon atoms in a hydrolytically stable manner and include, for example, oxygen; hydrocarbon, such as alkylene, exemplified by ethylene, propylene and isobutylene, and phenylene; hydrocarbon containing one or more hetero atoms selected from oxygen, nitrogen and sulfur, such as ether-, thioether-, ester- or amide-containing hydrocarbon; siloxane, such as polydimethylsiloxane: and combinations thereof.

Preferably, Z is selected from the group of radicals having the formula $—(C_2H_4SiMe_2)_x(OSiMe_2)_yD—$. Herein Me denotes methyl and D denotes oxygen or $C_2H_4$. The value of the subscript x can range from 0 to 2, preferably 1, and the subscript y can range from 0 to 6, preferably 0 or 1, each both inclusive, and the sum of x+y is zero or more.

Preferred Z linkages include silhydrocarbonsiloxane linkages, such as $—(OSiMe_2)CH_2CH_2—$, $—(CH_2CH_2SiMe_2)O—$, $—(CH_2CH_2SiMe_2)(OSiMe_2)CH_2CH_2—$, and $—(CH_2CH_2SiMe_2)(OSiMe_2)O—$; silhydrocarbon linkages, such as $—(CH_2CH_2SiMe_2)CH_2CH_2—$ and $—CH_2CH_2—$; and siloxane linkages, such as $—(OSiMe_2)O—$ and $—O—$. Most preferably Z contains an ethylene linkage bonded to the silicon atom bearing OR' radicals.

Specific examples of suitable curing radicals include, but are not limited to $(MeO)_3SiCH_2CH_2—$, $(MeO)_3SiO—$, $Me(MeO)_2SiO—$, $(MeO)_3SiCH_2CH_2SiMe_2CH_2CH_2SiMe_2O—$, $(MeO)_3SiCH_2CH_2SiMe_2O—$, $(MeO)_3SiCH_2CH_2SiMe_2OSiMe_2O—$ and $(MeO)_3SiCH_2CH_2SiMe_2OSiMe_2CH_2CH_2—$.

Herein the ethylene radical is sometimes written as $C_2H_4$ to indicate the isomeric mixture of $CH_2CH_2$ and $CH_3CH$ linkages that are obtained when hydrosilylation reaction between a silicon-bonded vinyl radical and a silicon-bonded hydrogen atom occurs. For example, the formula $(MeO)_3SiC_2H_4SiMe_2O—$ is to be construed as encompassing $(MeO)_3SiCH_2CH_2SiMe_2O—$ and/or $(MeO)_3SiCH(CH_3)SiMe_2O—$.

Capping radicals are present in the SPSA component to reduce, and preferably eliminate, the silanol content of the component. In the capping radicals R can be any of said monovalent hydrocarbon radical delineated for the curing radicals; however, methyl, vinyl and phenyl are preferred and methyl is most preferred. Specific examples of suitable capping radicals include, but are not limited to $Me_3SiO—$, $Me_2ViSiO—$ and $PhMe_2SiO—$.

Silicon-bonded radicals of the silicone pressure sensitive adhesive component which are not curing radicals or capping radicals having the formulae indicated are selected from divalent oxygen atoms linking silicon atoms and monovalent radicals selected from hydrogen atoms and the hydrocarbon radicals noted above for R.

The SPSA component of the compositions of this invention bearing curing and capping radicals can be prepared by introducing the required curing and capping radicals, in any desired sequence, into a preformed SPSA and/or into one or more of the siloxane components of the SPSA, by way of reactive sites, such as silicon-bonded hydroxyl or vinyl radicals, therein.

SPSA compositions which can be used to prepare the SPSA component of the compositions of this invention comprises (1) an organopolysiloxane resin and (2) a polydiorganosiloxane gum. The weight ratio of resin (1) to gum (2) in the SPSAs ranges from 5/95 to 70/30, preferably 40/60 to 60/40. The silicon-bonded radicals of these SPSAs are selected from the group consisting of divalent oxygen atoms linking silicon atoms, hydroxyl radicals, and monovalent hydrocarbon radicals, such as alkyl, aryl, alkenyl, cycloalkyl, cycloalkenyl, aralkyl and alkaryl; and hydrogen atoms.

The organopolysiloxane resin (1) consists essentially of $R^1_3SiO_{1/2}$ siloxane units and $SiO_{4/2}$ siloxane units and can be dissolved, substantially completely, in either a hydrocarbon liquid such as benzene, toluene, xylene, heptane and the like or in a silicone liquid such as cyclic or linear polydiorganosiloxanes.

In the $R^1_3SiO_{1/2}$ siloxane units $R^1$ denotes a monovalent hydrocarbon radical preferably having less than 20 carbon atoms, and most preferably having from 1 to 10 carbon atoms, a hydroxyl radical or a hydrogen atom.

Examples of suitable hydrocarbon $R^1$ radicals include alkyl radicals, such as methyl, ethyl, propyl, pentyl, octyl, undecyl and octadecyl, alkenyl radicals, such as vinyl, allyl and 5-hexenyl; cycloalphatic radicals, such as cyclohexyl and cyclohexenylethyl; and aryl radicals such as phenyl, tolyl, xylyl, benzyl and 2-phenylethyl.

At least one-third, and more preferably substantially all $R^1$ radicals, in the formula for component (1) are methyl radicals. Examples of preferred $R^1_3SiO_{1/2}$ siloxane units include $HMe_2SiO_{1/2}$, $Me_3SiO_{1/2}$, $PhMe_2SiO_{1/2}$, and $Me_2ViSiO_{1/2}$ where Me, Ph and Vi denote methyl, phenyl and vinyl.

The mol ratio of the $R^1_3SiO_{1/2}$ siloxane units to $SiO_{4/2}$ siloxane units of component (1) has a value of from 0.5/1 to 1.5/1, preferably from 0.6/1 to 0.9/1. These mol ratios are easily measured by $Si^{29}$ n.m.r. spectroscopy.

Component (1) consisting essentially of $R^1_3SiO_{1/2}$ siloxane units and $SiO_{4/2}$ siloxane units can be prepared by any suitable method. That is to say, it is believed that the organopolysiloxane resin (1) can be prepared by, for example, silane co-hydrolysis methods or silica hydrosol capping methods known in the art. Component (1) is preferably prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310; each incorporated herein to teach how to prepare organopolysiloxane resins which can be reacted to contain curing radicals or which can be used to make SPSAs which can be reacted to contain curing radicals.

Component (2) of the SPSA component to be converted to contain curing radicals is a polydiorganosiloxane gum having the general formula $R^3 R^2{}_2 SiO(R^2{}_2 SiO)_n SiR^2{}_2 R^3$. In this formula each $R^2$ denotes a hydrogen atom or a monovalent hydrocarbon radical and each $R^3$ denotes a radical selected from the group consisting of $R^2$ radicals and OH radicals. Examples of $R^2$ radicals include the hydrocarbon radicals delineated above for $R^1$, including preferred species.

At least 50%, and preferably at least 90%, of the $R^2$ radicals of Component (2) are methyl radicals. The methyl radicals can be distributed in any preferred manner in the polydiorganosiloxane.

General examples of polydiorganosiloxanes which are suitable for use as component (2) in the compositions of this invention include hydroxyl-, hydrogen- and hydrocarbon-terminated polydiorganosiloxanes. Specific examples of these polydiorganosiloxane include, but are not limited to, the polydiorganosiloxanes in the examples disclosed below and $HMe_2 SiO(Me_2 SiO)_n SiMe_2 H$, $ViMe_2 SiO(Me_2 SiO)_n SiMe_2 Vi$, $ViMe_2 SiO(Me_2 SiO)_{0.02n}(MeViSiO)_{0.02n}SiMe_2 Vi$. $Me_3 SiO(Me_2 SiO)_{0.9n} (MeViSiO)_{0.1n}SiMe_3$, $Me_3 Sio(Me_2 SiO)_{0.9n}(MeHSiO)_{0.1n}SiMe_3$, $HOMe_2SiO(Me_2SiO)_nSiMe_2 OH$, and $HOR^2{}_2SiO(Me_2SiO)_{0.95n}(MeViSiO)_{0.05n}SiR^2{}_2 OH$, wherein Me, Vi and Ph denote methyl, vinyl and phenyl, respectively.

The average values of the subscript n in the above formulae are such that the organopolysiloxane component (2) has a viscosity at 25° C. of from 100,000 centipoise (100 pascal-seconds) to 100,000,000 centipoise (100 kilopascal-seconds) and more. The exact value of the subscript n needed to provide a viscosity value falling within said limits depends upon the identity of the $R^2$ radicals; however, for hydroxyl-terminated and-/or $R^2$-terminated polydiorganosiloxanes containing at least 90% methyl radicals n will have a value ranging from one to several thousand. From a consideration of maximum adhesive properties, component (2) is preferably a gum having a viscosity of at least 1,000,000 centipoise at 25° C.

Component (2) can comprise trace amounts of siloxane branching sites, such as $R^2SiO_{3/2}$ units and $SiO_{4/2}$ units, and can be comprised of a single polydiorganosiloxane or a mixture of two or more different polydiorganosiloxanes, if desired. Polydiorganosiloxanes are well known in the organosilicone art and their synthesis needs no delineation herein. Many are commercially available from major silicone manufacturers.

SPSAs having sites of the formula ≡SiOH, herein also denoted as a silanol-functional SPSA, can be any of those known in the art. The disclosures of U.S. Pat. Nos. 2,736,721; 2,814,601; 2,857,356; 3,527,842; 3,528,940; 3,839,075; 3,929,704; 3,983,298; 4,309,520; 4,584,355; 4,591,622; and 4,774,297 are incorporated herein by reference to illustrate silanol-functional SPSAs that can be used to prepare the moisture-curable SPSA component of the compositions of this invention.

SPSAs having sites of the formula ↑ Si-alkenyl, herein also denoted as an alkenyl-functional SPSA, can be prepared, for example, by replacing one or more of the silanol-functional components normally used to prepare a silanol-functional SPSA compositions known in the art with an alkenyl-functional component.

SPSAs having sites of the formula ≡SiH, herein also denoted as hydrogen-functional SPSA, can be prepared, for example, by replacing one or more of the silanol-functional components normally used to prepare silanol-functional SPSA compositions known in the art with hydrogen-functional component.

A preferred SPSA composition to be used to prepare the SPSA component of the compositions of this invention is a bodied SPSA composition. A bodied SPSA composition can be prepared by heating a solution of a silanol-functional SPSA in a solvent, such as a water-azeotroping hydrocarbon, at reflux until its silanol content has been reduced, preferably to a value of less than one weight percent.

The SPSA component of this invention can be prepared by a process wherein an ≡SiX-functional SPSA is reacted with a compound that will convert a desired number of ≡SiX groups in the SPSA to curing radicals having the formula noted above. Any ≡SiOH which are not converted to curing radicals must be capped with $R_3$ SiO— radicals to obtain a moisture-curable SPSA of this invention which has substantial resistance to gelling when it is stored in the absence of moisture. It should be understood that at least the polydiorganosiloxane gum or the organopolysiloxane resinous portion or the SPSA composition made therefrom must contain a sufficient number of ≡SiX reactive sites to accomodate the introduction of the desired number of curing radicals.

Curing radicals having the formula $R_b (OR')_{3-b}SiZ$— can be introduced by any process wherein the Y radical of $R_b(OR')_{3-b}SiY$ reacts with an X radical of an X-substituted SPSA to form a Z radical, as noted above. The process for forming a Z radical can encompass the reactions of silicon chemistry, such as the reaction of silanols or of silicon hydrides; or of organic chemistry, such as the reaction of an alcohol with a carboxylic acid to form an ester linkage. Conveniently, for this purpose, one can adapt one or more of the several methods which are disclosed in the art for preparing moisture-curable silicone elastomers and/or sealants and U.S. Pat. Nos. 3,122,522; 3,161,614 (Re 29,760); U.S. Pat. Nos. 3,175,993; 3,334,067; 4,100,129; 4,395,526; 4,599,394; 4,772,675; 4,847,400; and 4,962,174 are incorporated herein by reference to show the preparation of moisture-curable compositions which comprise silicon-bonded alkoxy groups and a catalyst.

In particular the disclosures of Weyenberg. U.S. Pat. No. 3,175,993; Lucas. U.S. Pat. No. 4,599,394: Klosowski and Meddaugh, U.S. Pat. No. 4,772,675; Krahnke and Saam, U.S. Pat. No. 4,847,400; and Bilgrien and Berg, U.S. Pat. No. 4,962,174 are noted for the preparation of the SPSA component bearing silicon-bonded curing radicals having the formula $Me_b (MeO)_{3-b} SiC_2 H_4 SiMe_2 (OSiMe_2)_y D$— wherein y has an average value of from 0 to 6, preferably 0 to 1, each both inclusive.

The SPSA component bearing curing radicals can be prepared by the application of any of the above-noted processes to SPSA compositions and/or to one or more of their several components. Briefly, these methods comprise hydrosilylation reactions and silanol-converting reactions; the latter comprising the reaction of a silanol group with a silicon-bonded hydrolyzable radical such as amine, silylamine, alkoxy, halogen or acyloxy; or with a silicon-bonded hydrogen atom.

For example, $(MeO)_3 SiCH_2 CH_2—$ radicals and $(MeO)_3 SiCH_2 CH_2 SiMe_2 OSiMe_2 CH_2 CH_2$ —radicals can be introduced into a vinyl radical-containing SPSA component with compounds having the formula $(MeO)_3SiH$ and $(MeO)_3 SiCH_2 CH_2 SiMe_2 OSiMe_2 H$, respectively. In these examples $Y=H$ or $CH_2 CH_2 SiMe_2 OSiMe_2 H$, respectively, and $X=CH_2=CH—$.

Radicals having the formulae $(MeO)_3SiO—$ and $Me(MeO)_2SiO—$ can be introduced into a silanol-functional SPSA component with compounds having the formulae $(MeO)_4 Si$ and $Me(MeO)_3 Si$, respectively. Alternatively, compounds having the formulae $(MeO)_3 SiH$ and $Me(MeO)_2 SiH$, respectively, can be used. In these examples $Y=MeO—$ or $H$, respectively, and $X=OH$.

$(MeO)_3 SiCH_2 CH_2 SiMe_2 O—$, $(MeO)_3 SiCH_2 CH_2 SiMe_2 OSiMe_2 O—$ and $(MeO)_3 SiCH_2 CH_2 SiMe_2 CH_2 CH_2 SiMe_2 O—$ radicals can be introduced into a silanol-functional SPSA component by the use of compounds such as $(MeO)_3 SiCH_2 CH_2 SiMe_2 OSiMe_2 H$, $(MeO)_3 SiCH_2 CH_2 SiMe_2 CH_2 CH_2 SiMe_2 H$ and $(MeO)_3 SiCH_2 CH_2 SiMe_2 H$.

Most conveniently, curing radicals having the formula $R_b(OR')_{3-b}SiZ—$ are introduced by reacting a silanol-containing SPSA with a moisture-reactive compound having the formula $R_b(OR')_{3-b}SiY$ wherein Y bears a silicon-bonded hydrolyzable radical such as halogen, acyloxy, amino, amido, etc. In view of the type of by-products that are produced during the reaction Y preferably bears an amino nitrogen which provides an ammonia by-product.

Silazanes and disilazanes are preferred compounds for introducing the curing radicals into a silanol-functional SPSA, in view of the type of by-products that will be produced during the reaction. Examples of silazanes and disilazanes include $(MeO)_3 Si(CH_2 CH_2 SiMe_2)_x (OSiMe_2)_y NH_2$ and $\{(MeO)_3 Si(CH_2 CH_2 SiMe_2)_x (OSiMe_2)_y\}_2 NH$, such as $\{(MeO)_3 SiCH_2 CH_2 SiMe_2\}_2 NH$. A highly preferred curing radical for the composition of this invention is $(MeO)_3 SiC_2 H_4 SiMe_2 O—$ because it can be readily introduced into the SPSA composition by way of a disilazane.

The SPSA component bearing silicon-bonded curing radicals having the formula $R_b (OR')_{3-b} SiZ—$ can bear any number of curing radicals; the rate and extent of cure of the SPSA composition, when exposed to moisture, being dependent on the concentration of curing radicals.

It is believed at this time that the SPSA component should contain an average of at least 1 millimol, preferably at least 2 millimols, of curing radicals per 100 parts by weight of SPSA component to obtain a desirable rate of cure. On the other hand it is currently believed that the SPSA component should contain no more than 100, preferably no more than 50, millimols of curing radicals per 100 parts of SPSA component to achieve a desirable adhesive strength. Of course, mols and parts are to be expressed in comparable terms. For example, 5 millimols and 100 parts can be expressed as 5 milligram-mols and 100 gram parts or as 5 millipound-mols and 100 pound parts.

Capping radicals having the formula $R_3 SiO—$ can be introduced into the SPSA component by any process wherein the Y' radical of $R_d SiY'$ reacts with a silanol radical of a silanol-substituted SPSA to form a siloxane linkage, as noted above. Briefly, these processes comprise the reaction of a compound bearing a silicon-bonded hydrolyzable radical such as amine, amido, silylamine, halogen or acyloxy: or with a silicon-bonded hydrogen atom.

For example, radicals having the formulae $Me_3 SiO—$ can be introduced into a silanol-functional SPSA component with compounds having the formulae $Me_3 SiCl$, $Me_3 SiOCOCH_3$, $Me_3 SiH$, $Me_3 SiN(CH_3)COCH_3$, $(Me_3 Si)_3$, $NCOCH_3$, $Me_3 SiNH_2$, $(Me_3 Si)_2 NH$.

In view of the type of by-products that are produced during the reaction Y' preferably bears an amino nitrogen which provides an ammonia by-product, such as with silazanes and disilazanes, such as $Me_3 SiNH_2$ and $(Me_3 Si)_2 NH$. The disclosure of U.S. Pat. No. 3,527,659 is incorporated herein to teach a preferred method for capping silicon-bonded hydroxyl radicals.

The SPSA component can bear any number of capping radicals, provided the number is sufficient to cap a significant number, preferably substantially all, of the silanols in the SPSA component. By a significant number of silanols it is meant a number sufficient to provide improved shelf-stability for the composition. It is currently believed that substantially no silanols should remain unreacted in the SPSA component in order to obtain maximum shelf-life.

A suitable reaction catalyst should be used when introducing curing and capping radicals into the SPSA component. For example, when using a silicon hydride it is desirable to use a platinum group metal catalyst such as platinum or rhodium and its compounds and complexes to accelerate the hydrosilylation reaction. When using a silazane it is desirable to use a strong acid catalyst such as trifluoroacetic acid. When using an alkoxysilane to introduce curing radicals it is desirable to use a titanate catalyst, such as tetrabutyl titanate.

In addition to a SPSA component bearing silicon-bonded curing radicals the compositions of this invention further comprise an effective amount of a catalyst component (B) to accelerate the reaction of the curing radicals with moisture to form siloxane bonds.

Catalysts for accelerating the reaction of the OR' radicals with moisture to form siloxane bonds are well known in the silicone elastomer art and need no detailed delineation herein. Briefly, said catalysts include, but are not limited to, metal salts of monocarboxylic acids, such as stannous octoate, dibutyltin dilaurate and dibutyltin diacetate; titanium esters, such as tetrabutyl titanate, tetraethylhexyl titanate and tetraphenyltitanate; siloxytitanates, such as tetrakis(trimethylsiloxy)titanium and bis(trimethylsiloxy)-bis(isopropoxy)titanium: and betadicarbonyltitanium compounds, such as bis-(acetylacetonyl)diisopropyl titanate; amines, such as hexylamine; and their acetate and quat salts.

Preferred catalysts are bis(acetylacetonyl)diisopropyl titanate and certain orthotitanates, such as tetrabutyl titanate, and their partial hydrolyzates. The amount of titanium-containing catalysts typically ranges from 0.1 to 2%, based on the weight of the SPSA component.

In addition to a SPSA component bearing silicon-bonded curing radicals and an effective amount of a catalyst component (B) to accelerate the reaction of the curing radicals with moisture to form siloxane bonds the compositions of this invention further comprise (C) an effective amount of a silicon compound bearing a plurality of silicon-bonded alkoxy radicals to improve the shelf life of the composition.

Component (C) in the compositions of this invention can be any compound bearing two or more, preferably three or more, silicon-bonded alkoxy radicals. Any other silicon-bonded radicals in component (C) are to be selected from the group consisting of divalent oxygen atoms linking silicon atoms, divalent hydrocarbon atoms linking silicon atoms, hydrogen atoms and monovalent hydrocarbon radicals.

The component (C) can be a silane or a partial hydrolyzates and/or condensates thereof. Examples of suitable silanes include di-, tri- and tetra-alkoxy silanes wherein the alkoxy radicals are, for example, methoxy, ethoxy, n-propoxy, i-propoxy and butoxy, each used singularly or in mixtures, and the other silicon-bonded radicals, if present, include hydrogen; monovalent hydrocarbon, such as alkyl, such as methyl, ethyl, propyl, aryl, such as phenyl and benzyl; and olefinic, such as vinyl and allyl; and polyvalent hydrocarbon, such as ethylene and phenylene. Included herein are orthosilicates, such as ethyl orthosilicate and n-propyl orthosilicate; alkyltrialkoxy silanes, such as methyltrimethoxy silane: alkylene-bis-trialkoxysilanes, such as bis-trimethoxysilylethane; and polysilicates, such as ethyl polysilicate.

The compositions of this invention can be prepared by introducing curing and capping radicals of the formulae noted above into a SPSA composition, preferably in solution, to form the SPSA component and thereafter admixing a suitable amount of the silicon component (C) bearing a plurality of silicon-bonded alkoxy radicals and a suitable amount of the catalyst component (B).

The solvent component can be any liquid that will dissolve the SPSA and the curing radical-containing component without adversley reacting therewith in the absence of moisture. Examples of suitable solvents include aromatic hydrocarbons, such as benzene, toluene and xylene; aliphatic hydrocarbons, such as hexane, heptane and cyclohexane; halogenated hydrocarbons such as chlorocarbons; oxygenated solvents such as esters, ketones and lower alcohols; and volatile siloxanes such as hexamethyldisiloxane and cyclopolydimethylsiloxanes.

The compositions of this invention typically, but not necessarily, further comprise an appropriate quantity of a solvent to provide a lower viscosity for, and hence an easier application of, the SPSA composition to various substrates. The amount of solvent is not critical; however, only a sufficient amount to facilitate the preparation, handling and applying of the composition is recommended. The solvent, when used, is preferably used in an amount sufficient to provide a viscosity of from 10,000 to 100,000 centipoise at 25° C. for the composition.

Concrete examples of this component are the same as those delineated above for use during the preparation of the SPSA component and mixtures thereof. The solvent, when used, is preferably a non-reactive hydrocarbon solvent or siloxane solvent. It has been found convenient, but not necessary, to prepare the SPSA component in a solvent that can be allowed to remain in the final composition as a viscosity-adjusting solvent.

The compositions of this invention can be used in all of the applications to which the SPSA compositions of the art are directed since they possess adhesive properties in their uncured state, one or more of which will improve upon exposure to ambient moisture. Additionally, the compositions of this invention can be used in all of the applications to which the permanent adhesive compositions of the art are directed since certain embodiments thereof will cure to the permanent adhesive state upon exposure to ambient moisture. It is expected that the compositions of this invention will be recognized as being useful for novel applications in view of their moisture-activated curing capability.

The solvent-containing compositions of this invention, whether catalyzed or uncatalyzed, can be stored in the absence of moisture for extended periods of time without experiencing any substantial gelling. Accordingly, they can be prepared months prior to being used.

The solvent-free compositions of this invention, whether catalyzed or uncatalyzed, can be stored, for example as a transfer film, in the absence of moisture for extended periods of time without experiencing any substantial loss of adhesive properties. Accordingly, they can be prepared up to several months prior to being exposed to moisture.

Thereafter it is preferred to apply the adhesive-bearing substrate to the surface before the adhesive has experienced a complete loss of tack.

The following examples are disclosed to illustrate, but not limit, the present invention, which is properly delineated by the appended claims. Unless stated otherwise, all ratios, parts and percentages are by weight and temperatures are in degrees Celsius.

Measurement of Tensile Adhesion

Tensile Adhesion was measured in accordance with ASTM C 1135-90. "Standard Test Method for Determining Tensile Adhesion of Structural Sealants", except as follows: the test specimens were conditioned at 23° C. for 0, 3, 14 and 28 days, instead of the 21 days required by ASTM C 1135-90: and the test specimens were assembled with an adhesive-bearing core of cured silicone rubber, rather than a solid plug of sealant of the same size which was cured in contact with the glass panels.

The core was a cured extrusion of cured silicone rubber having a cinder block cross section with dimensions of $\frac{3}{8}$"h $\times \frac{1}{2}$"w $\times 2$"l and the 2 rectangular holes having dimensions of $\frac{1}{4}$"h $\times 3/32$"w $\times 2$"l. The bonding surfaces of the core were the opposing $\frac{1}{4}$ wide surfaces, having 1 in$^2$ area.

The adhesive-bearing core was prepared by applying a solution of SPSA to a release liner in a wet thickness of 20 mils, unless stated otherwise, and devolatilized the applied solution at 70° C. for 10 minutes in an air-circulating oven. To assemble the adhesive-bearing core a $\frac{1}{2}$" wide strip of adhesive film, with its release liner, was adhered to one bonding surface of the silicone rubber core. The process was repeated on the other bonding surface of the core. To assemble the test specimen the liners were removed from the transferred adhesive and the exposed adhesive surfaces were adhered to the 1"$\times$3" panels of the test specimen.

Materials

TBT—Tetrabutyl titanate.

TDIDE—Titanium diisopropoxy-bis(ethylacetoacetate).

SSA2—A reaction product of tetraisopropyl titanate and an equimolar mixture of mono- and di-2-ethylhexyl acid phosphate, available as Tilcom-SSA2 from Tioxide House, London, U.K.

KR238—An adduct of dioctyl hydrogen phosphite and titanium bis(dioctyl)-pyrophosphato-O-ethylenediolato.

HMDZ—Hexamethyldisilazane.

TFAA—Trifluoroacetic acid.

ETMDZ(C)—A reaction mixture of 15.6% non-silazane materials comprising 5% starting materials and 10.6% {(MeO)$_3$ SiCH$_2$ }$_2$ ; 79.8% silazane materials comprising 10.6% {(MeO)$_3$ SiC$_2$ H$_4$ SiMe$_2$ NHSiMe$_2$ CH$_2$ }$_2$ , 69.2% {(MeO)$_3$ SiC$_2$ H$_4$ SiMe$_2$ }$_2$ NH; and 4.6% unidentified products; prepared by adding tetramethyldisilazane to a mixture of vinyltrimethoxy silane and chloroplatinic acid complexed with divinyltetramethyldisiloxane.

Polymer A—hydroxyl-terminated polydimethylsiloxane gum having a plasticity number of 137-152, as measured by ASTM 926-67. and a viscosity of at least 10,000,000 centipoise at 25°.

Solution A—A xylene solution containing 70% of a soluble organopolysiloxane consisting of (CH$_3$ )$_3$ SiO$_{\frac{1}{2}}$ units and SiO$_{4/2}$ units in a mol ratio of 0.8/1 and having hydroxyl content of 3.45% and M$_n$=1.963, M$_v$/M$_n$=2.57 as measured by gel-permeation chromatography using Varian TSK 4000+2500 columns at 35°, a chloroform mobile phase at 1 mL/m and an IR detector set at 8.5 microns to detect SiO$_2$. Polystyrene standards were used for linear regression calibrations.

Examples 1-13

A solution of 29 parts of xylene, 40 parts Solution A and 23 parts of Polymer A was heated for 5 hours at 140° and then cooled to 70° . whereupon 4.4 parts of ETMDZ(C) and 0.2 parts of TFAA were added and the mixture was heated at 100° for 1 hour. The reaction mixture was again cooled to 70° and 3.5 parts of HMDZ was added and the mixture again heated at 100° for 1 hour.

Thirteen 100-part portions of the resulting base composition containing approximately 40% solvent were each mixed with 3.64 parts of n-propylorthosilicate and catalyzed with TBT, KR238, SSA2, or TDIDE to provide 13 compositions of this invention, as noted in Table I. The catalyzed compositions were cast onto a release liner at a wet thickness of 20 mils and devolatilized.

Half of the liner-bearing adhesive film was cut to a width of ½" and used to transfer adhesive to both bonding sides of four pieces of the silicone core to provide double-sided tapes. The double-sided tapes, with liner in place, were stored in the absence of moisture for 2 months at room temperature. The aged tapes were freed of their liners and then tested for tensile adhesion, as described above, using glass panels. The release from the liner and the subsequent tack of the adhesive were noted as the test specimens were being prepared. The results have been summarized in Table I. Adhesive failure from the glass was obtained in each case.

All fresh and 2-month old double-sided tapes using adhesives of this invention demonstrated excellent 0-day tensile adhesion which increased substantially over a 14-day exposure to ambient moisture.

Half of the liner-bearing adhesive film was covered with another release liner and was stored in the absence of moisture for 6 or 8 months at room temperature. The aged adhesive transfer films were cut to a width of ½" and were then used to prepare double-sided tapes, as noted above, and the tapes were immediately tested for tensile adhesion, as described above, using glass panels. The release from the liner and wet-out on glass of the adhesive were noted when the test specimens were being prepared. The results have been summarized in Table II.

All transfer adhesive films of this invention demonstrated good to excellent wet-out on glass and excellent initial 0-day tensile adhesion which increased over a 28-day exposure to ambient moisture.

EXAMPLES 14-17

Examples 5, 6, 7 and 13 were duplicated except 3.78 parts of bis-(trimethoxysilyl)ethane was used in place of the 3.64 parts of n-propylorthosilicate to provide the compositions of Examples 14, 15, 16 and 17, repectively. The four compositions of this invention were used to make adhesive transfer films which were stored in the absence of moisture for 6 months at room temperature. The aged adhesive transfer films were then used to prepare double-sided tapes. as noted above, and the tapes were immediately tested for tensile adhesion as described above, using glass panels. The release and wet-out of the adhesive were noted before the test specimens were prepared. The results have been summarized in Table II. All transfer adhesive films of this invention demonstrated excellent initial 0-day tensile adhesion which increased over a 28-day exposure to ambient moisture.

TABLE I

| | | | | | TA, psi after 0 and 2 Months Aging | | | | | |
|---|---|---|---|---|---|---|---|---|---|---|
| | Catalyst | | Adh** | | 0 Day Cure | | 3 Day Cure | | 14 Day Cure | |
| Ex | Type | Amnt. | R | ST | 0 mo. | 2 mo. | 0 mo. | 2 mo. | 0 mo. | 2 mo. |
| 1 | KR238 | 1.000 | m | m | 110 | 88 | 170 | 85 | 195 | 118 |
| 2 | KR238 | 0.500 | m | m | 86 | 100 | 151 | 98 | 190 | 133 |
| 3 | KR238 | 0.250 | g | g | 97 | 96 | 136 | 100 | 164 | 120 |
| 4 | TBT | 1.000 | g | m | 99 | — | 124 | — | 144 | — |
| 5 | TBT | 0.500 | m | m | 118 | 70 | 112 | 90 | 164 | 130 |
| 6 | TBT | 0.250 | m | m | 97 | 60 | 160 | 118 | 180 | 108 |
| 7 | TBT | 0.125 | g | g | 98 | 74 | 123 | 109 | 137 | 118 |
| 8 | SSA2 | 1.000 | — | — | 95 | — | 155 | — | 196 | — |
| 9 | SSA2 | 0.500 | m | m | — | 75 | 160 | 110 | >225 | 155 |
| 10 | SSA2 | 0.250 | g | g | 80 | 65 | 127 | 105 | 156 | 132 |
| 11 | SSA2 | 0.190 | — | — | 70 | — | — | — | 115 | — |
| 12 | SSA2 | 0.096 | — | — | 74 | — | — | — | 85 | — |
| 13 | TDIDE | 0.200 | g | g | 111 | 84 | 166 | 113 | 190 | 120 |

*See Materials section above for type meanings.
**R = Release; ST = Subsequent tack.
g = good; m = moderate.

TABLE II

| | Catalyst | | Adh** | | TA after 6 or 8 Months Adhesive Aging | | |
|---|---|---|---|---|---|---|---|
| | | | | | 0 Day Cure | 3 Day Cure | 28 Day Cure |
| Ex | Type* | Amnt. | R | WO | Months/psi | Months/psi | Months/psi |
| 2 | KR238 | 0.500 | g | e | 8/87 | 8/107 | 8/136 |
| 5 | TBT | 0.500 | g | g | 6/90 | 6/115 | 6/112 |
| 6 | TBT | 0.250 | s | g | 6/93 | 6/100 | 6/100 |
| 7 | TBT | 0.125 | s | g | 6/80 | 6/110 | 6/120 |
| 8 | SSA2 | 1.000 | e | g | 8/107 | 8/155 | 8/164 |
| 9 | SSA2 | 0.500 | e | e | 8/118 | 8/151 | 8/160 |
| 10 | SSA2 | 0.250 | g | e | 8/102 | 8/125 | 8/140 |
| 13 | TDIDE | 0.200 | g | g | 6/75 | 6/92 | 6/115 |
| 14 | TBT | 0.500 | g | g | 6/90 | 6/115 | 6/123 |
| 15 | TBT | 0.250 | s | g | 6/80 | — | 6/100 |
| 16 | TBT | 0.125 | s | g | 6/89 | 6/110 | 6/118 |
| 17 | TDIDE | 0.200 | g | g | 6/74 | 6/96 | 6/115 |

*See Materials section above for type meanings.
**R = Release; WO = Wet-out.
e = excellent; g = good; s = spotty.

EXAMPLES 18-20

The composition of Example 4 was duplicated except the 3.64 parts of n-propylorthosilicate were replaced with an amount of either MTM (Ex. 18), EOS (Ex. 19) or EPS (Ex. 20). as indicated in Table III. The three compositions of this invention were used to make double-sided tapes which were immediately tested for tensile adhesion. All adhesives released well from their liners. After a 28 day cure all adhesives were tackless after being separated from the glass of the test specimens.

EXAMPLES 21-23

The composition of Example 13 was duplicated except 3.64 parts of n-propylorthosilicate were replaced with an amount of either MTM (Ex. 21), EOS (Ex. 22) or EPS (Ex. 23), as indicated in Table III. The three compositions of this invention were used to make double-sided tapes which were immediately tested for tensile adhesion. All adhesive released well from their liners. After a 28 day cure adhesive 21 was dry, adhesive 22 was slightly tacky and adhesive 23 was tacky after being separated from the glass of the test specimens.

TABLE III

| | Alkoxy Cpd. | | 0 Days | 3 Days | 14 Days | 28 Days |
|---|---|---|---|---|---|---|
| Ex | Name* | Parts | TA, psi | TA, psi | TA, psi | TA, psi |
| 18 | MTM | 1.88 | 95 | 106 | 134 | 134 |
| 19 | EOS | 2.92 | 103 | 115 | 126 | 121 |
| 20 | EPS | 3.20 | 102 | 108 | 121 | 123 |
| 21 | MTM | 1.88 | 91 | 100 | 101 | 118 |
| 22 | EOS | 2.92 | 89 | 92 | 93 | 100 |
| 23 | EPS | 3.20 | 85 | 89 | 89 | 88 |

*MTM = methyltrimethoxy silane; EOS = ethyl orthosilicate; EPS = ethyl polysilicate.

That which is claimed is:

1. A composition comprising:
    (A) a silanol-free silicone pressure sensitive adhesive component bearing curing radicals having the formula (MeO)$_3$ SiC$_2$ H$_4$ SiMe$_2$ O— and capping radicals having the formula Me$_3$ SiO— wherein Me denotes methyl;
    (B) an effective amount of a catalyst component to accelerate the reaction of the curing radicals with moisture to form siloxane bonds; and
    (C) an effective amount of a silane compound, or partial hydrolyzates and/or condensates thereof, bearing a plurality of silicon-bonded alkoxy radicals to improve the shelf life of the composition; wherein the silanol-free silicone pressure sensitive adhesive component (A) bearing curing radicals has been prepared by a method comprising reacting (i) a silicone pressure sensitive adhesive composition having reactive sites of the formula ≡SiX, and X denotes an alkenyl radical, a hydroxyl radical or a hydrogen atom, substantially all X being OH, with (ii) a moisture-reactive compound having the formula {(MeO)$_3$ SiC$_2$ H$_4$ SiMe$_2$ }$_2$ Nh, and with (iii) a silanol-capping compound having the formula (Me$_3$ Si)NH; all other silicon-bonded radicals in (i) being selected from the group consisting of divalent oxygen atoms linking silicon atoms, hydrogen atoms and monovalent hydrocarbon radicals.

2. A composition in accordance with claim 1 wherein the silicone pressure sensitive adhesive composition having reactive sites of the formula ≡SiX comprises (1) 40 to 60 parts by weight of an organopolysiloxane resinuous portion comprising Me$_3$ SiO$_\frac{1}{2}$ siloxane units and SiO$_{4/2}$ siloxane units, wherein the mol ratio of the Me$_3$ SiO$_\frac{1}{2}$ siloxane units to SiO$_{4/2}$ siloxane units has a value of from 0.6/1 to 0.9/1 and (2) 40 to 60 parts by weight of a polydimethylsiloxane gum having a viscosity at 25° C. of at least 1,000,000 centipoise; and component (B) is a titanate.

3. A composition in accordance with claim 2 wherein component (C) is n-propyl orthosilicate.

4. A composition in accordance with claim 3 wherein component (B) comprises tetrabutyl titanate or titanium diisopropoxy-bis-(ethylacetoacetate).

5. A composition in accordance with claim 1 bearing from 2 to 50 millimols of curing radicals per 100 parts by weight of the silicone pressure sensitive adhesive component.

6. A composition in accordance with claim 1 further comprising a solvent for the moisture-curable silicone pressure sensitive adhesive.

7. A composition in accordance with claim 1 wherein the silicone pressure sensitive adhesive composition having reactive sites of the formula ≡SiX, is prepared by bodying a mixture of (1) 40 to 60 parts by weight of an organopolysiloxane resinuous portion comprising Me$_3$ SiO$_\frac{1}{2}$ siloxane units and SiO$_{4/2}$ siloxane units, wherein the mol ratio of the Me$_3$ SiO$_\frac{1}{2}$ siloxane units to SiO$_{4/2}$ siloxane units has a value of from 0.6/1 to 0.9/1 and (2) 40 to 60 parts by weight of a polydimethylsiloxane gum having a viscosity at 25° C. of at least 1,000,000 centipoise.

8. A composition in accordance with claim 1 wherein the moisture-reactive compound comprises {(MeO)$_3$SiC$_2$H$_4$SiMe$_2$}$_2$NH which hsa been prepared by adding tetramethyldisilazane to a mixture of vinyltrimethoxy silane and chloroplatinic acid, complexed with divinyltetramethyldisiloxane, and allowing a hydrosilylation reaction to occur.

9. A composition in accordance with claim 8 wherein the amount of moisture-reactive compound is sufficient to react with from 2 to 50 millimols of said silicon-bonded hydroxyl radicals for every 100 parts by weight of the silicone pressure sensitive adhesive component having reactive sites.

10. A composition in accordance with claim 9 wherein a solvent component for component (i) is used during said reacting.

* * * * *